US008006254B2

(12) United States Patent
Craft et al.

(10) Patent No.: US 8,006,254 B2
(45) Date of Patent: Aug. 23, 2011

(54) BEQUEATHING PRIVILEGE TO A DYNAMICALLY LOADED MODULE

(75) Inventors: David Jones Craft, Wimberley, TX (US); Matthew Douglas Dirba, Dallas, TX (US); Vinit Jain, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/867,126

(22) Filed: Oct. 4, 2007

(65) Prior Publication Data

US 2009/0094624 A1    Apr. 9, 2009

(51) Int. Cl.
   *G06F 9/44* (2006.01)
(52) U.S. Cl. ...................................................... 719/331
(58) Field of Classification Search .................. 719/310, 719/331, 332; 717/127, 128, 129
   See application file for complete search history.

(56) References Cited

U.S. PATENT DOCUMENTS

| | | | |
|---|---|---|---|
| 5,911,065 A * | 6/1999 | Williams et al. | 718/107 |
| 6,289,369 B1 * | 9/2001 | Sundaresan | 718/103 |
| 6,630,946 B2 * | 10/2003 | Elliott et al. | 715/781 |
| 7,827,551 B2 * | 11/2010 | Kulbak et al. | 718/100 |
| 2002/0194389 A1 * | 12/2002 | Worley et al. | 709/310 |
| 2004/0111720 A1 | 6/2004 | Vertes | |
| 2007/0067771 A1 * | 3/2007 | Kulbak et al. | 718/100 |
| 2008/0127292 A1 * | 5/2008 | Cooper et al. | 726/1 |

FOREIGN PATENT DOCUMENTS

FR    2872605 A1    6/2006

OTHER PUBLICATIONS

Peckham, "User Space Loader", IBM Research Disclosure, vol. 42, No. 418, Feb. 1999, pp. 1-3.
Bull, "Transparent Dynamic Subroutine Loader", IBM Technical Disclosure Bulleting, May 1986, pp. 5535-5537.
"IRIX 6.4 cpr (1)", SGI, pp. 1-6, retrieved May 10, 2007. http://techpubs.sgi.com/library/tpl/cgi-bin/getdoc.cgi?coll=0640&db=man&fname=/usr/share/catman/u_man/cat1/cpr.z.
U.S. Appl. No. 11/867,303, Craft et al.
U.S. Appl. No. 11/867,101, Brandyberry et al.

* cited by examiner

*Primary Examiner* — Van H Nguyen
(74) *Attorney, Agent, or Firm* — Yee & Associates, P.C.; David A. Mims, Jr.

(57) ABSTRACT

A computer implemented method, apparatus, and computer program product for transferring a privilege to a module. In one embodiment, a set of privileges required to initiate execution of code associated with the software module is identified to form enhanced privileges. The application is frozen. The enhanced privileges are unassigned to the application and the application has insufficient privileges to initiate execution of code associated with the software module. The software module is loaded into available application address space associated with the application. The enhanced privileges are transferred to the application. Execution of the application is unsuspended and the code associated with the software module is executed within the application.

20 Claims, 7 Drawing Sheets

BEQUEATHING PRIVILEGE TO A DYNAMICALLY LOADED MODULE

CROSS-REFERENCE TO RELATED APPLICATIONS

This application is related to the following applications entitled Process Retext for Dynamically Loaded Modules, application Ser. No. 11/867,101, filed Oct. 4, 2007,); assigned to a common assignee and incorporated herein by reference.

BACKGROUND OF THE INVENTION

1. Field of the Invention

The present invention is related generally to a data processing system and in particular to a method and apparatus for bequeathing privileges. More particularly, the present invention is directed to a computer implemented method, apparatus, and computer usable program code for dynamically bequeathing a privilege to a module loaded into an application address space.

2. Description of the Related Art

In a software partitioned environment, a single instance of the operating system can be partitioned into multiple virtual operating system environments. Each of these virtual operating system environments is known as a software partition. A software partition is a virtualized operating system environment within a single instance of the operating system. An example of a software partition is AIX® workload partition (WPAR), which is a product available from International Business Machines (IBM®) Corporation.

Software running within each software partition will appear to have its own separate instance of the operating system. A software partition may include one or more processes. Processes in a software partition are completely isolated from processes in other software partitions in the same system. They are not allowed to interact with processes in other software partitions in the same system.

Data processing systems frequently utilize data integrity operations to ensure that the state of data stored in memory may be recreated in the event of a failure. A checkpoint operation is a data integrity operation in which the application state and memory contents for an application running on the kernel are written to stable storage at particular time points to provide a basis upon which to recreate the state of an application in the event of a failure. The particular time point at which state and memory contents are written to stable storage may be referred to as a checkpoint.

Checkpoint data may be used to migrate or restore a software partition, including any processes running in the partition, from one physical computing device to another physical computing device, while processes are still running in the software partition. Migration of a software partition involves checkpointing the state of every process in the partition on one data processing system and then restoring the state of every process on another data processing system using the checkpoint data.

SUMMARY OF THE INVENTION

The illustrative embodiments provide a computer implemented method, apparatus, and computer program product for transferring a privilege to a module. In one embodiment, a set of privileges required to initiate execution of code associated with the software module is identified to form enhanced privileges. The application is frozen. The enhanced privileges are unassigned to the application and the application has insufficient privileges to initiate execution of code associated with the software module. The software module is loaded into available application address space associated with the application. The enhanced privileges are transferred to the application. Execution of the application is unsuspended and the code associated with the software module is executed within the application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
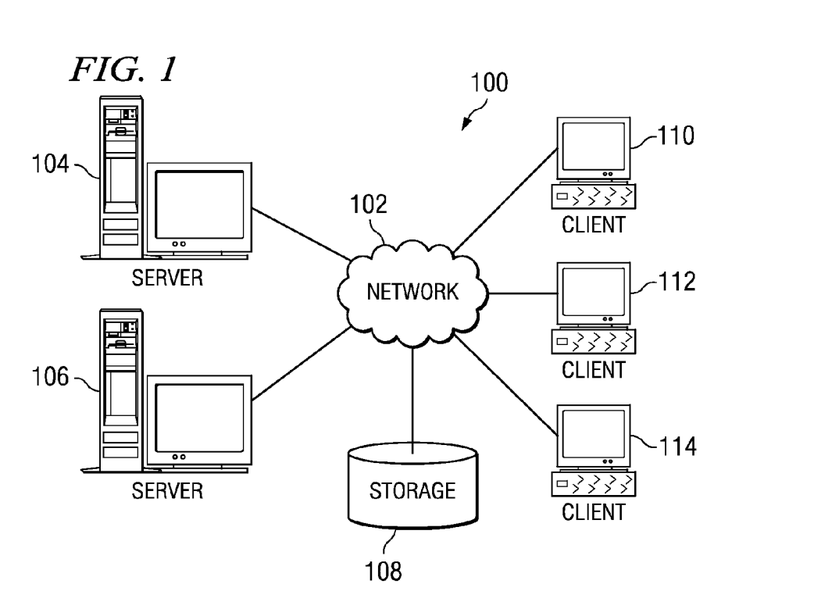
FIG. 1 is a pictorial representation of a network of data processing systems in which illustrative embodiments may be implemented.
Figure 2:
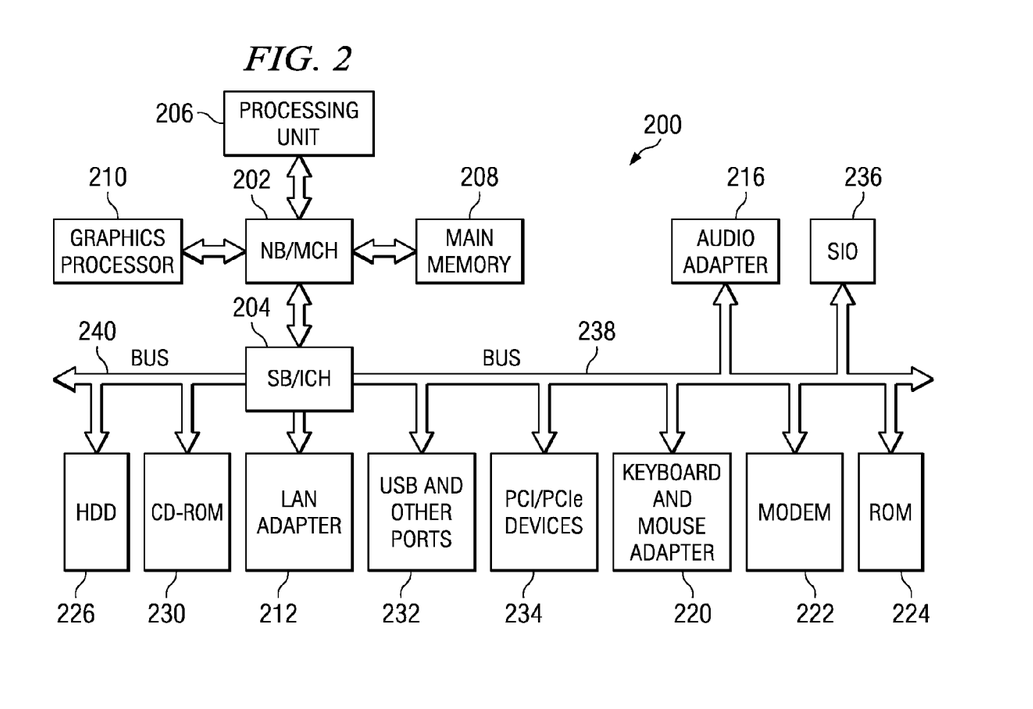
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In this example, server 104 and server 108 support a software partitioned environment.

In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 may also include software partitions. Clients 110, 112, and 114 are clients to server 104 in this example. Network data processing system 100 may include additional servers, clients, and other devices not shown.

In this example, server 104 supports a software partition having one or more applications running in the software partition. The term "running" refers to a processor actively executing the instructions of a process.

The software partition is being migrated to server 106. In one embodiment, prior to migration of the software partition, a checkpoint process initiates the gathering and saving of checkpoint data regarding the state of all applications running in the software partition that is being migrated. The checkpoint data is saved to state files on any type of storage device, such as storage unit 108.

However, in another embodiment, checkpoint data is not saved to state files on storage 108. Instead, a departure server, such as server 104, transmits the checkpoint data directly to an arrival server, such as server 106. An arrival server is the server onto which the migrating software partition is moved. In other words, during migration of a software partition, the software partition is migrated or moved from a departure server to an arrival server. In this case, the checkpoint data is never saved on storage unit 108 and/or is saved on storage unit 108 after or in conjunction with transmitting the checkpoint data to server 106.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments. Data processing system 200 supports a software partitioned environment that includes one or more software partitions.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A software partition is a virtualized operating system environment within a single instance of the operating system. A single instance of the operating system can be partitioned into multiple virtual operating system environments. Each of these virtual operating system environments is known as a software partition. An example of a software partition is AIX® workload partition (WPAR), which is a product available from International Business Machines (IBM®) Corporation.

Software running within each software partition will appear to have its own separate instance of the operating system. A software partition may include one or more processes. Processes in one software partition are completely isolated from processes in other software partitions on the same data processing system. They are not allowed to interact with processes in other software partitions.

A software partition, including any processes running in the partition, may be migrated from one physical computing device to another physical computing device while still active. The processes and/or other content of a software partition may also be migrated into another software partition on the same physical computing device.

Migration of a software partition involves checkpointing the state of every process in the partition on a first data processing system and then restoring the state of every process on a second partition using the checkpoint data. As used herein, the second partition may be a different partition located on the first data processing system or a different partition located on a different data processing system than the first data processing system.

A checkpoint operation is a data integrity operation in which the application state and memory contents for an application are written to stable storage at a particular time to provide a basis upon which to recreate the state of an application and/or processes running in a software partition, such as when a software partition is migrated from one physical computing device to another physical computing device. The process by which the state and memory contents are written to stable storage may be referred to as a checkpoint.

When a software partition is migrated from a departure server to an arrival server, a checkpoint operation is performed to obtain and store information regarding applications and/or processes running in the software partition. The state data may be saved into a state file on a local data storage device or on a remote data storage device, such as, but not limited to, a local hard disk, a network disk, a flash memory, a tape drive, a nonvolatile random access memory (NVRAM), or any other type of data storage device. Checkpoint operations are performed at various pre-defined points in time to generate checkpoint data.

The checkpoint data is utilized to recreate/restore the state of all processes running in the departure software partition at the last checkpoint into a new arrival software partition. A departure software partition is a first software partition on a computing device that is being migrated to a different computing device and/or a different software partition on the same computing device. The arrival software partition is a different software partition than the departure software partition. The processes running in the departure software partition are restored or restarted on the arrival software partition.

Process modules that perform operations for an application can be inserted into the application by an external process. A module is a self-contained software component for performing a function. A checkpoint module is a module including software for performing checkpoint procedures on an application process to generate and save checkpoint data. A checkpoint procedure is the sequence of actions or instructions for performing a checkpoint operation. For example, a checkpoint module for performing checkpoint procedures can be inserted into an application to gather checkpoint data describing the state of the application at the checkpoint time.

A module, such as, but not limited to, a checkpoint module, may be inserted into an application address space outside mainline application context via mechanisms such as signal handlers. A signal handler is a function that is called when a signal is received by any process. A shell script refers to software that provides access to services of an application or a kernel. In this case, the signal handler inserts the checkpoint module into application address space in response to receiving a signal initiating insertion of the module into the application address space.

The illustrative embodiments recognize that software checkpoint procedures which allow a process to capture and record the currently running state of an application executing in a software partition, as well as recreate that application state on another machine or at a later time, are inherently powerful functions. As such, the orchestration of the checkpoint and restart of the checkpoint process may utilize special security privileges that are different and/or greater than the privileges ordinarily associated with the application.

The illustrative embodiments recognize that isolation environments, such as a software partitions, do not normally run applications with security privileges sufficient to checkpoint themselves. The illustrative embodiments recognize that it would be beneficial to dynamically bequeath an enhanced privilege to a module that is being loaded into an application in a software partition to provide the module with sufficient security privileges to perform certain privileged operations.

Therefore, the illustrative embodiments provide a computer implemented method, apparatus, and computer program product for transferring a privilege to a module. In one embodiment, a set of privileges required to initiate execution of code associated with the software module is identified to form enhanced privileges. The set of privileges includes one or more privileges.

The application is frozen. In this example, the application has insufficient privileges to initiate execution of code associated with the software module. The process loads the software module into available application address space associated with the application. The enhanced privileges are transferred to the application. Execution of the application is unsuspended and the code associated with the software module executes in the application context.

Figure 3:
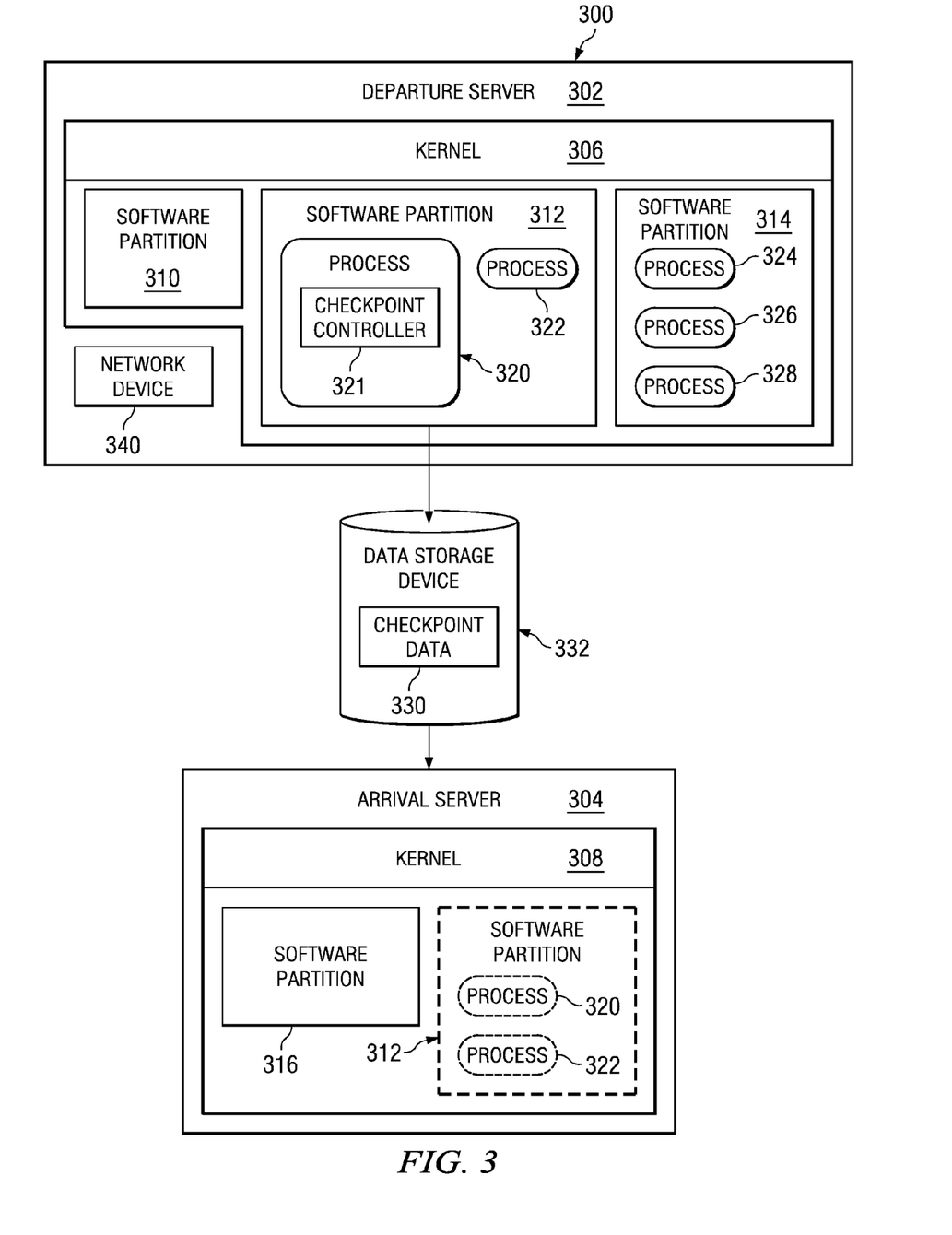
FIG. 3 is a block diagram illustrating the checkpoint process during the migration of a software partition in accordance with an illustrative embodiment.

FIG. 3 is a block diagram illustrating a checkpoint procedure during the migration of a software partition in accordance with an illustrative embodiment. Data processing system 300 may be implemented in any type of network data processing system, including, without limitation, data processing system 100 in FIG. 1.

Departure server 302 and arrival server 304 are computing devices that support a software partitioned environment. Departure server 302 is the server on which the software partition is located before migration. Arrival server 304 is the server on which the software partition is located after migration. When a software partition is migrated, it "departs" from departure server 302 and "arrives" on arrival server 304.

A software partition may be migrated to a different physical machine or a different logical machine for a variety of reasons. For example, without limitation, processes on an overloaded machine may need to be moved to a larger machine that is better able to handle the work load associated with the processes in the software partition. In another example, a software partition may be migrated from a departure machine to an arrival machine to permit maintenance or upgrading of the departure machine.

The software partition on departure server 302 may be referred to as a first software partition or a departure software partition. The software partition on arrival server 304 after migration of the software partition to arrival server 304 may be referred to as a second software partition or an arrival software partition. Departure server 302 and arrival server 304 may be implemented in any type of computing device supporting a software partitioned environment, such as, but not limited to, server 104 or client 110 in FIG. 1. For example, departure server 302 may be, but is not limited to, a Websphere server or an Apache web server.

Kernel 306 and kernel 308 are software processes for managing resources on data processing system 300, such as, without limitation, processor resources, input and output (I/O) resources, and memory resources on a computing device. In other words, kernel 306 is an abstraction layer between hardware and software on departure server 302 and kernel 308 is an abstraction layer between hardware and software on arrival server 304.

Departure server 302 includes one or more software partitions for partitioning the operating system image within kernel 306 into multiple virtual operating system instances. In this example, departure server 302 includes software partitions 310-314. Arrival server 304 includes software partition 316. However, a server, such as departure server 302, is riot limited to three software partitions. In accordance with the illustrative embodiments, a computing device, such as departure server 302 or arrival server 304, may include two software partitions, four software partitions, or any other number of software partitions in accordance with the illustrative embodiments.

Each software partition may include one or more processes. A process is an executing instance of a computer program or application, a task, or an operation being performed on data. In other words, a process executes the instructions in a computer program. A process may include any type of application or process running in a software partition. In this example, software partition 312 includes processes 320-322 and software partition 314 includes processes 324-328.

Software partition 312 is being migrated from departure server 302 to arrival server 304. A checkpoint controller is associated with each process running on software partition 312. A checkpoint controller is a software component of a given process that gathers process state data, data regarding open files and open sockets bound to the process, the state of streams associated with the process, the state of in-flight files associated with the process, and any other information regarding the current state of a process in software partition 312.

Checkpoint controller 321 is a checkpoint that is run within the process context. Essentially, the process runs the checkpoint code associated with checkpoint controller 321 to checkpoint itself. Checkpoint code associated with checkpoint controller 321 is inserted into process 320 as a checkpoint module. In this example, an enhanced privilege is bequeathed to process 320 to enable process 320 to execute checkpoint code associated with the checkpoint module that is inserted into process 320.

The checkpoint data may then be used to recreate or re-establish each process running in software partition 312 to the same state that existed at the time the checkpoint controller gathered the checkpoint data. The time a checkpoint controller gathers checkpoint data is referred to as a checkpoint time.

For example, checkpoint controller 321 associated with process 320 saves state data for process 320. Another checkpoint controller (not shown) associated with process 322 saves state data associated with process 322 to a state file. The state data for processes 320-322 form checkpoint data 330. Checkpoint data 330 is utilized to restore or restart processes 320-322 on arrival server 304 in the same state that processes 320-322 were in on departure server 302 at the time checkpoint data 330 was last saved.

Checkpoint data 330 is a set of state files on data storage device 332 for storing state data regarding processes running on a software partition. The set of state files in checkpoint data 330 may include one or more state files. State data is checkpoint data for processes running in a software partition that is gathered during a checkpoint process.

The state of each process in a software partition can be stored in one state file. In this example, if a software partition had ten processes running on the software partition, checkpoint data 330 would contain ten state files. Checkpoint data 330 stores checkpoint state data for processes 320-322 running in software partition 312 to state files on data storage device 332 to form checkpoint data 330. In this example, checkpoint data 330 stores state information for software partition 312. However, checkpoint data 330 may include state files for multiple software partitions, rather than only a single software partition.

Checkpoint data 330 is stored in data storage device 332. Data storage device 332 is any type of known or available device for storing data, including, without limitation, a hard disk, a compact disk (CD), a compact disk rewrite-able (CD-RW), a compact disk read-only memory, a non-volatile random access memory (NV-RAM), a flash memory, or any other type of data storage device. Data storage device 332 may be located locally to departure server 302, locally to arrival server 304, remotely to departure server 302, and/or remotely to arrival server 304.

In this example, data storage device 332 is located remotely to departure server 302. In other words, data storage device 332 is implemented using one or more network data storage devices that are accessible to departure server 302 and/or arrival server 304 via a network connection, such as network 102 in FIG. 1. For example, data storage device 332 may include one or more remote data storage devices, such as storage unit 108 in FIG. 1. A network connection may be enabled via a network device associated with departure server 302 and/or arrival server 304.

A network device (not shown) is any type of known or available network access software for allowing a computing device to access a network. The network device connects to a network connection. The network connection permits access to any type of network. For example, a network may include, but is not limited to, a local area network (LAN), a wide area network (WAN), the Internet, an intranet, an Ethernet, a wireless network, or any other type of network.

In another embodiment, data storage device 332 is located locally to departure server 302. Data stored in data storage device 332 is shared or made accessible to arrival server 304 using protocols, such as file transfer protocols (FTP), and/or any other protocols for accessing data in a remote data storage device.

In this example, data storage device 332 is a single data storage device. However, in accordance with the illustrative embodiments, data storage device 332 may include two or more data storage devices. For example, data storage device 332 may include, but is not limited to, any combination of a local hard disk, a local non-volatile random access memory, and/or a remote hard disk that is accessible to arrival server 304 over a network connection.

In this example, software partition 312 is an isolation environment which does not normally run applications with sufficient security privileges to checkpoint the applications running in software partition 312. For example, process 320 is an application running in software partition 312. Process 320 is associated with privileges that permit process 320 to perform certain operations. However, process 320 in this example does not have sufficient privileges to permit process 320 to execute a checkpoint process, such as checkpoint controller 321.

Therefore, a checkpoint process initiator having sufficient privileges to initiate a checkpoint process bequeaths the sufficient privileges to initiate the checkpoint process to process 320 when a checkpoint module having code for performing a checkpoint operation is loaded into process 320. This procedure for inserting a checkpoint module in an application address space and transferring privileges for executing the checkpoint operation associated with the checkpoint module from an initiation process to the application is discussed in greater detail in FIG. 4 below.

A module inserted in an application address space in this manner is required to fit within the address space of the application. Address space refers to the range of discrete memory space addresses that identify a physical location in computer memory for storing data associated with an application. The data associated with the application includes, but is not limited to, executable code for the application, any data in stack or heap memory, and any other data associated with the application.

The illustrative embodiments recognize that normal application text is not actually utilized during checkpoint processing performed by a checkpoint module. The normal application text is the executable code that performs the work or functions of the application. For example, if the application is a word processor, the application text is the executable code associated with performing word processing functions.

Instead, it is only the data that must remain addressable during a checkpoint that is utilized during the checkpoint procedure. For example, data associated with the application that is stored in the heap and the stacks are utilized during the checkpoint procedure. Thus, the illustrative embodiments perform an operation referred to as "retext" to move aside the current application process text area and load a module, such as, but not limited to, a checkpoint module text and data, into the application address space that was previously occupied by the application text. In one example, a checkpoint module is inserted into an application address space and the checkpoint module code is executed in the application context.

The process also transfers privileges sufficient to execute the code associated with the loaded module to the application to enable the application to execute the code associated with the module. Certain processes and operations associated with data processing system 300 are privileged so that any user and any process will not be permitted to perform those operations.

In other words, in a data processing system in which multiple different users access and execute operations, security and other access control measures may be necessary to prevent one or more users from accessing certain resources and/or executing certain operations. For example, an owner or creator of a file may wish to prevent other users from modifying the owner's file. Access controls are used to control which users have access to a file and what types of operations these users can perform on the file.

In role based access control (RBAC) access to execute certain procedures are controlled based on what privileges the user has been assigned, rather than basing access on the user's identity. In role based access control, a role consists of a set of one or more authorizations. A role is assigned to one or more users and/or one or more processes. Multiple roles may be assigned to a single user or process.

Each of the roles in a role-based access control system has certain privileges assigned to them which allow the users and processes assigned to these roles to initiate or execute certain privileged programs and/or access privileged data. The authorizations in the role determine the command access available for the user or process attempting to execute the privileged program.

For example, but without limitation, an operation for shutting down data processing system 300 may be privileged to prevent some processes and/or users from shutting down the system without authorization. In another example, performing a checkpoint operation of a running application may be privileged so that a user or a software process cannot initiate a checkpoint of the application without the appropriate security privilege.

The process bequeaths a privilege to a process or checkpoint module because the operating system is orchestrating a load of a "trusted module". The module is a trusted module because the operating system knows the module will only perform a set of operations it deems security safe within this processes module context.

Figure 4:
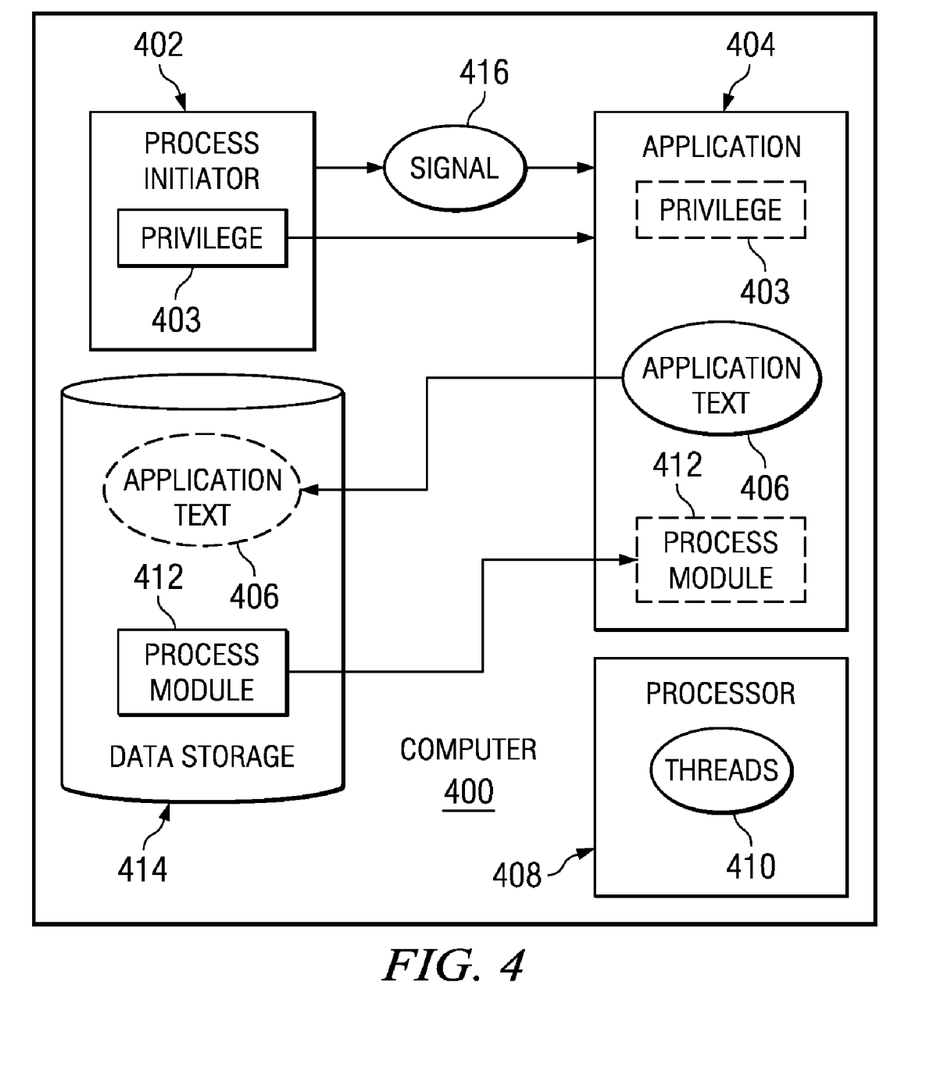
FIG. 4 is a block diagram illustrating a data flow through a data processing system during a transfer of privileges to a module in a retext operation in accordance with an illustrative embodiment.

FIG. 4 is a block diagram illustrating a data flow through a data processing system during a transfer of privileges to a module in a retext operation in accordance with an illustrative embodiment. Computer 400 may be implemented using any type of computing device, such as a personal computer, laptop, personal digital assistant, or any other computing device depicted in FIGS. 1 and 2.

In this example, process initiator 402 is an automated software agent for managing and/or controlling a retext operation and/or execution of a process module. In this example, process initiator 402 is a software process associated with an operating system on computer 300, such as, but not limited to, a workload manager for managing workload associated with computer 300 or a mobility checkpoint restart process for controlling the migration of executing processes from a departure software partition to an arrival software partition, as described in FIG. 3. Process initiator 402 also manages or initiates a retext operation in this embodiment. In another embodiment, process initiator 402 is a human user, such as, without limitation, a system administrator.

Process initiator 402 is associated with privilege 403. Privilege 403 is a privilege that permits process initiator 402 to initiate execution of checkpoint module 412. In other words, a process must be assigned privilege 403 to initiate execution of code associated with checkpoint module 412. In this manner, only certain authorized users and/or processes can initiate a process performed by checkpoint module 412, such as, without limitation, a checkpoint process.

Application 404 is any type of application or process running in an isolation environment. An isolation environment is a software partition, such as software partition 312 in FIG. 3. For example, application 404 could be, without limitation, a video game, a word processing application, a telnet application, an email application, a web browser application, a spread sheet, an application servicing database requests, a database application, such as, without limitation, DB2 by International Business Machines Corporation (IBM®), or any other type of application running on the software partition.

Application 404 includes application text 406. Application text 406 is executable code that performs the work or functions of application 404. Application 404 is not associated with privilege 403. In other words, application 404 running in the isolation environment does not have sufficient security privileges to initiate execution of code associated with checkpoint module 412.

Processor 408 is a processor, such as, without limitation, processor unit 206 in FIG. 2. Processor 408 is any type of known or available processor for executing a process on computer 400, including but not limited to, a central processing unit (CPU) or a digital signal processor (DSP). In this example, processor 408 is executing code associated with application 404.

Threads 410 is a set of one or more threads executing processes or tasks associated with application 404. For example, threads 410 may include a single thread, two threads, or twenty threads. In this example, threads 410 may include any number of threads. A thread is a part of a program that can execute independently of other parts of the program. In a multiprocessor system, two or more threads can execute concurrently on multiple processors.

Checkpoint module 412 is a self-contained software component for performing any type of software procedure or process on application 404. Checkpoint module performs checkpoint procedures on application 404 to generate and save checkpoint data, such as checkpoint data 330 in FIG. 3. A checkpoint module includes, but is not limited to, a module having checkpoint code for performing checkpoint operations on processes running on a software partition.

Checkpoint module 412 is stored on data storage 414. Data storage 414 may be implemented on any type of data storage device, including, but not limited to, storage 108 in FIG. 1 and/or data storage device 332 in FIG. 3. Data storage 414 may be a local data storage device to computer 400 as shown in FIG. 4. However, in another embodiment, data storage 414 may also be a data storage device that is remote to computer 400. Computer 400 accesses a remote data storage device via a network connection, such as network 102 in FIG. 1. Data storage 414 may be implemented as a single data storage device or as multiple data storage devices that are accessible to computer 400.

Process initiator 402 looks up a module, such as checkpoint module 412, that is to be loaded or inserted into application 404 during the retext operation. Process initiator 402 identifies a load module function using a load module symbol during signal delivery setup. The load module function is retrieved from a library of predefined functions, such as, but not limited to, the C library of functions (libc.a) for AIX® systems. In another embodiment, the load module function may be a user defined function rather than a predefined library function.

In this example, the load module function identified is a function for loading checkpoint module 412 into application 404.

Process initiator 402 sets up signal 416 to initiate the retext operation for checkpoint module 412. Process initiator 402 sends signal 416 to a signal handler associated with application 404. A signal handler is a function that is called when a signal is received by any application program. Signal 416 is received by each thread in threads 410 associated with application 404. Signal 416 initiates a thread rendezvous and retext operation. In this case, the signal handler intercepts signal 416 and initiates a thread rendezvous in the signal handler setup code.

Each thread in threads 410 rendezvous outside application text 406. Rendezvous refers to each thread meeting at the same point. In this case, threads 410 meet at a certain point in the kernel code outside of the normal application processing. In other words, the thread suspends execution of threads 410 at a safe point where all references to application text are no longer actively referenced by any thread. The rendezvous acts as a barrier that enables threads 410 to no longer actively depend on application text that is about to be vacated. During the thread rendezvous, the threads are not executing application text 406. In other words, execution of application 404 is frozen so that trusted code associated with checkpoint module 412 can be loaded into address space for application 404.

The last thread to enter the signal handler setup code at the rendezvous is designated as the primary thread. The primary thread performs subsequent operations while all the other threads in threads 410 wait at the rendezvous point until the retext operation is complete.

The primary thread proceeds to an untext operation which moves aside the current executable text area, application text 406, and sets up a new, virgin memory area of the same size in the application address space. In other words, the primary thread moves application text 406 out of the application address space. In one example, this can be accomplished by changing the memory addresses for application text 406. The virgin memory area that was previously occupied by application text 406 forms an available application address space.

The primary thread then proceeds into the load module function identified by Process initiator 402. The load module function loads checkpoint module 412 into the available application address space. In this example, the module function is a load checkpoint module function for loading a checkpoint module into the application address space for application 404.

The primary thread completes the retext operation via an operating system service that mimics the runtime dynamic loading of modules. The dynamic loading operation utilizes the virgin retext area instead of finding and allocating an unused memory area. The virgin retext area is an unused area of the application address space that was previously occupied by application text 406.

The entry point of the new retext module is saved. The primary thread stores the entry point of the retext module into the function destination for signal 416. In this example, signal 416 is a checkpoint signal. All threads in the rendezvous are now allowed to proceed into the retext module entry point. Checkpoint module 412 function performs checkpoint operations within the normal address space of application 404.

Process initiator 402 bequeaths privilege 403 to application 404 which now has loaded trusted code associated with checkpoint module 412 into address space for application 404. Checkpoint module 412 is trusted code because any procedure or operation performed by checkpoint module 412 cannot interfere with or alter operations performed by application text 406 or data stored by application text 406 because application text 406 is no longer executing.

Application 404 is unfrozen and the trusted code associated with checkpoint module 412 currently in the address space of application 404 begins executing within application 404. In this example, the trusted code executing within application 404 performs checkpoint procedures. The trusted code exits after performing the checkpoint procedures and the signal context is unwound.

In other words, on completion of operations performed by checkpoint module 412, threads 410 again rendezvous outside of checkpoint module 412. The primary thread proceeds to remove checkpoint module 412 from the application address space and retext the original application text 406 back into the application address space for application 404. The enhanced privileges associated with privilege 403 are removed from the application by process initiator 402 before allowing application 404 to return to normal processing and execution of application text 406.

In this manner, process initiator 402 bequeaths enhanced security privileges to application 404. The enhanced privileges enable application 404 to execute security privileged procedures performed by checkpoint module 412. In this example, checkpoint module 412 is a checkpoint module for performing a checkpoint of application 404.

In this example, privilege 403 bequeathed to application 404 by process initiator 402 permits application 404 to have sufficient privileges for initiating execution of the checkpoint code associated with checkpoint module 412 where application 404 did not have sufficient privileges to perform a checkpoint operation prior to process initiator 402 transferring privilege 403 to application 404.

In this embodiment, process initiator 402 attempts to initiate a checkpoint operation of application 404. This happens externally to the isolation environment in which application 404 is located. Process initiator 402 holds privilege 403 which are sufficient privileges to perform the checkpoint operation. The checkpoint procedure running trusted code, such as checkpoint module 412, verifies that process initiator 402 holds sufficient privileges.

The trusted checkpoint initiation code freezes application 404 and proceeds to load trusted checkpoint code, checkpoint module 412, into application 404. This code is provide by the checkpointing system and is not normally bound with application 404. In AIX® workload partitions, this code is inserted on a checkpoint signal handler and the execution context of this code only occurs within signal processing.

The trusted checkpoint initiation code, process initiator 402, bequeaths the checkpoint privilege, privilege 403, to application 404, which now has loaded trusted code into address space of application 404.

Application 404 is unfrozen by process initiator 402 and application 404 executes trusted code associated with checkpoint module 412. Execution of the trusted code begins within the signal context. In other words, if application 404 is a DB2 application, execution of the trusted code begins within the context of DB2.

The trusted code exits after performing checkpoint procedures and the signal context is unwound. The enhanced checkpoint privilege is removed from the application address space by process initiator 402 before allowing application 404 to return to normal processing.

In this example, the module dynamically loaded into application 404 is a checkpoint module. However, checkpoint module 412 may be a module having any type of program code to be loaded into application 404.

The illustrative embodiments are not limited to only dynamically loading modules for performing checkpoint, but may include any module requiring privilege whose load is requested and orchestrated by the operating system. For example, checkpoint module 412 may be a module for performing garbage collection functions, data retrieval functions, state restoration, and/or restart functions.

Figure 5:
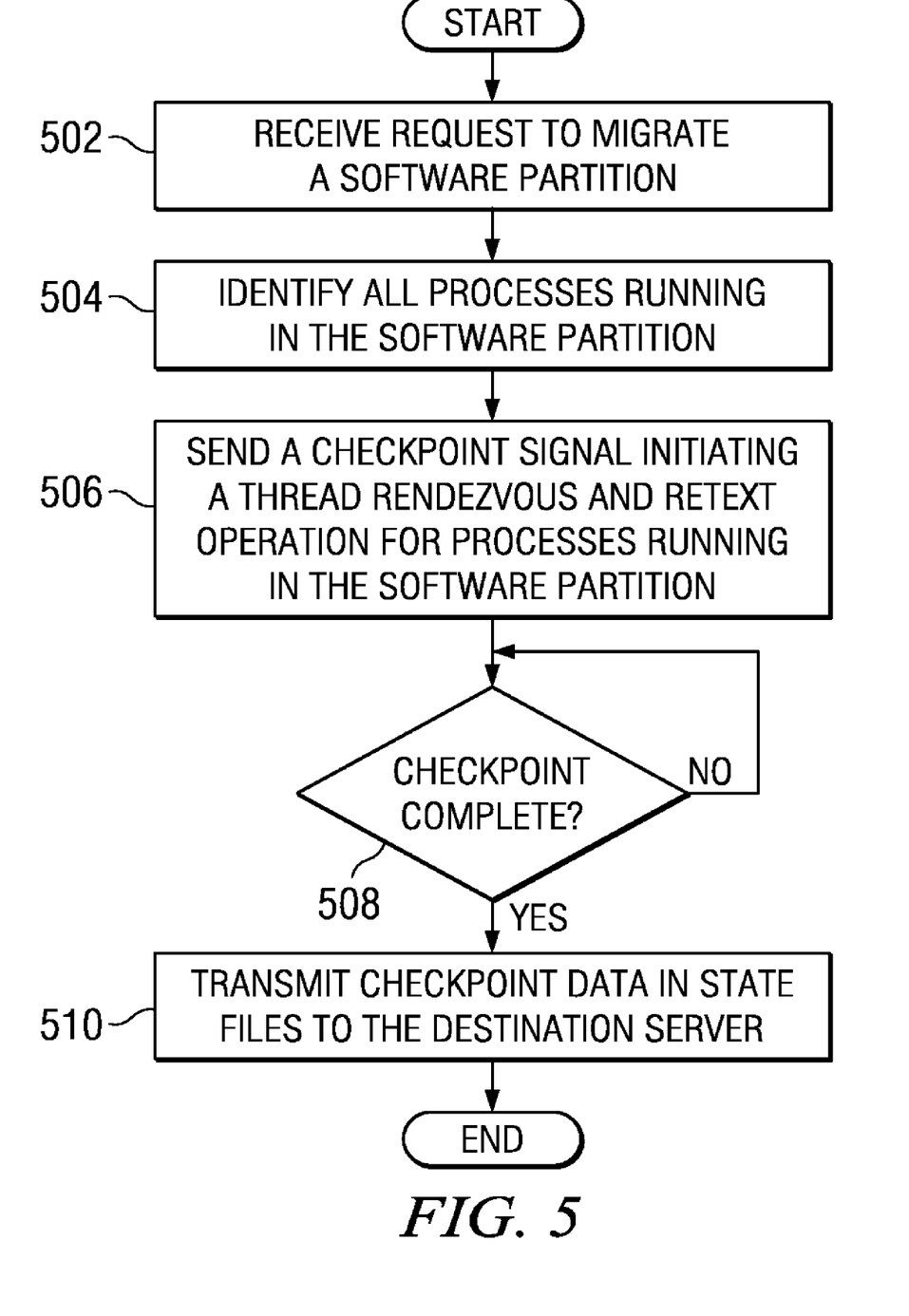
FIG. 5 is a flowchart illustrating a process for initiating a retext operation in accordance with an illustrative embodiment.

Turning now to FIG. 5, a flowchart illustrating a process for initiating a retext operation is shown in accordance with an illustrative embodiment. The process in FIG. 5 is implemented by a software process for managing checkpointing and retext operations, such as, but not limited to, process initiator 402 in FIG. 4.

The process begins by receiving a request from a user to migrate a software partition (step 502). The process initiator identifies all processes running in the software partition (step 504). The process initiator sends a checkpoint signal (SIGCHKPNT) initiating a thread rendezvous and retext operation for processes running in the software partition (step 506). In this example, the process initiator also transfers privileges from the process initiator to a module being dynamically loaded into an application address space during the retext operation to enable the application to have sufficient privileges to initiate execution of the checkpoint process.

The process initiator makes a determination as to whether the checkpoint process is complete (step 508). If the checkpoint process is not complete, process initiator returns to step 508 and waits until the checkpoint process is complete. The checkpoint process is performed by a checkpoint module, such as checkpoint module 412 in FIG. 4. When the checkpoint process is complete at step 508, the process transmits checkpoint data gathered and saved by the checkpoint process to state files to the destination server (step 510) with the process terminating thereafter.

Figure 6:
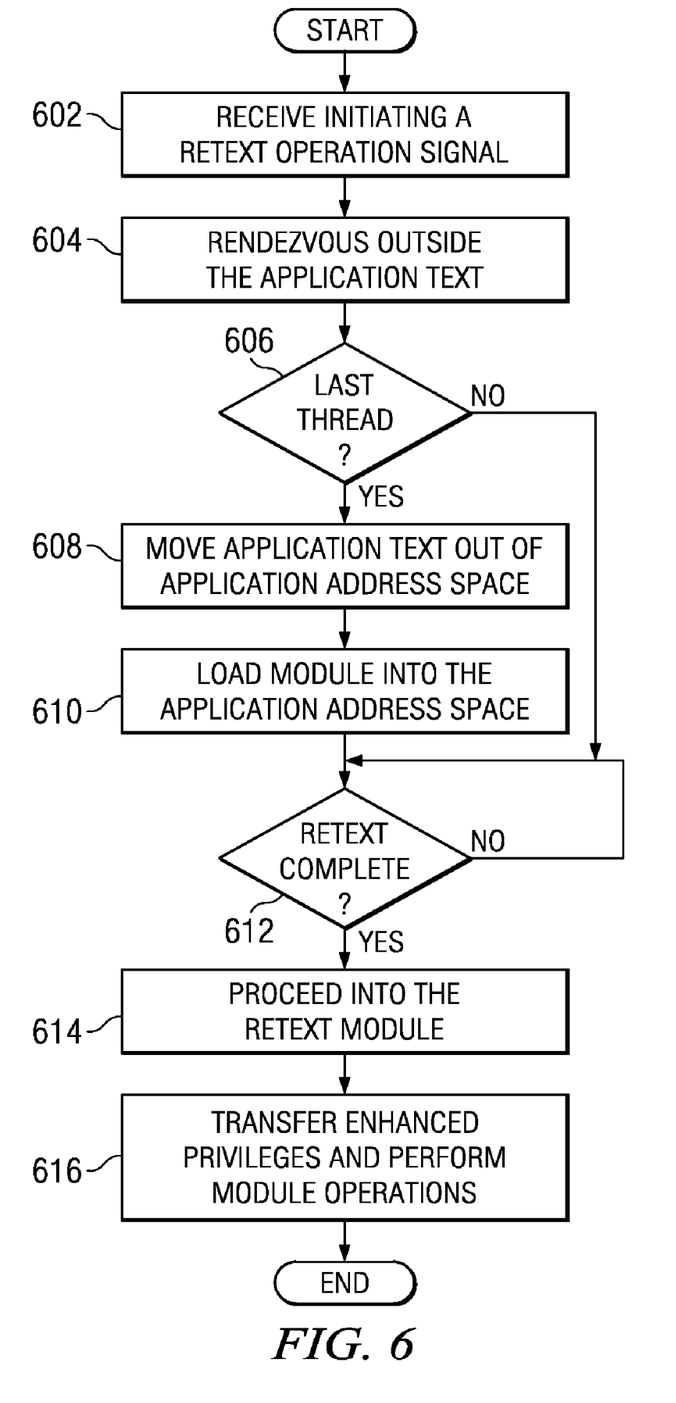
FIG. 6 is a flowchart illustrating a process for performing a transfer of privileges from an initiator process to a retext module in accordance with an illustrative embodiment.

FIG. 6 is flowchart illustrating a process for performing a transfer of privileges from an initiator process to a retext module in accordance with an illustrative embodiment. The process in FIG. 6 is implemented by threads associated with an application running in a software partition, such as threads 410 in FIG. 4.

The process begins when threads associated with an application running on a software partition receive a signal initiating a retext operation (step 602). In one example, the signal is a checkpoint signal initiating a retext operation to load a checkpoint module into an application to perform a checkpoint operation on the application.

Each thread in the threads rendezvous outside the application text (step 604). In step 604 the threads may meet or come together at some point outside of the application text. A determination is made as to whether a thread in the threads is a last thread to enter the rendezvous point (step 606). If a thread is not the last thread, the thread remains at the rendezvous point until the retext operation is complete at step 612.

If a thread is the last thread, that thread is the primary thread and the thread moves the application text out of the application address space (step 608) and load a retext module into the application address space (step 610) using an operating system service that mimics the runtime dynamic loading of modules. The retext module is a module that is dynamically loaded into an application address space, such as checkpoint module 412 in FIG. 4. The dynamic loading operation utilizes the retext area that was previously occupied by the application text rather than finding and allocating an unused memory area for the checkpoint module.

The process makes a determination as to whether the retext operation is complete (step 612). If the retext operation is not complete, the process returns to step 612 until the retext operation is complete. The retext operation is complete when the application text has been moved out of the application address space and the checkpoint module has been successfully loaded into the application address space.

When the retext operation is complete, all the threads proceed into the retext module (step 614). The enhanced privileges are transferred to the application and the threads then perform the operations associated with the retext module (step 616) with the process terminating thereafter. The retext module may be any type of software module, including, but not limited to, a checkpoint module.

Figure 7:
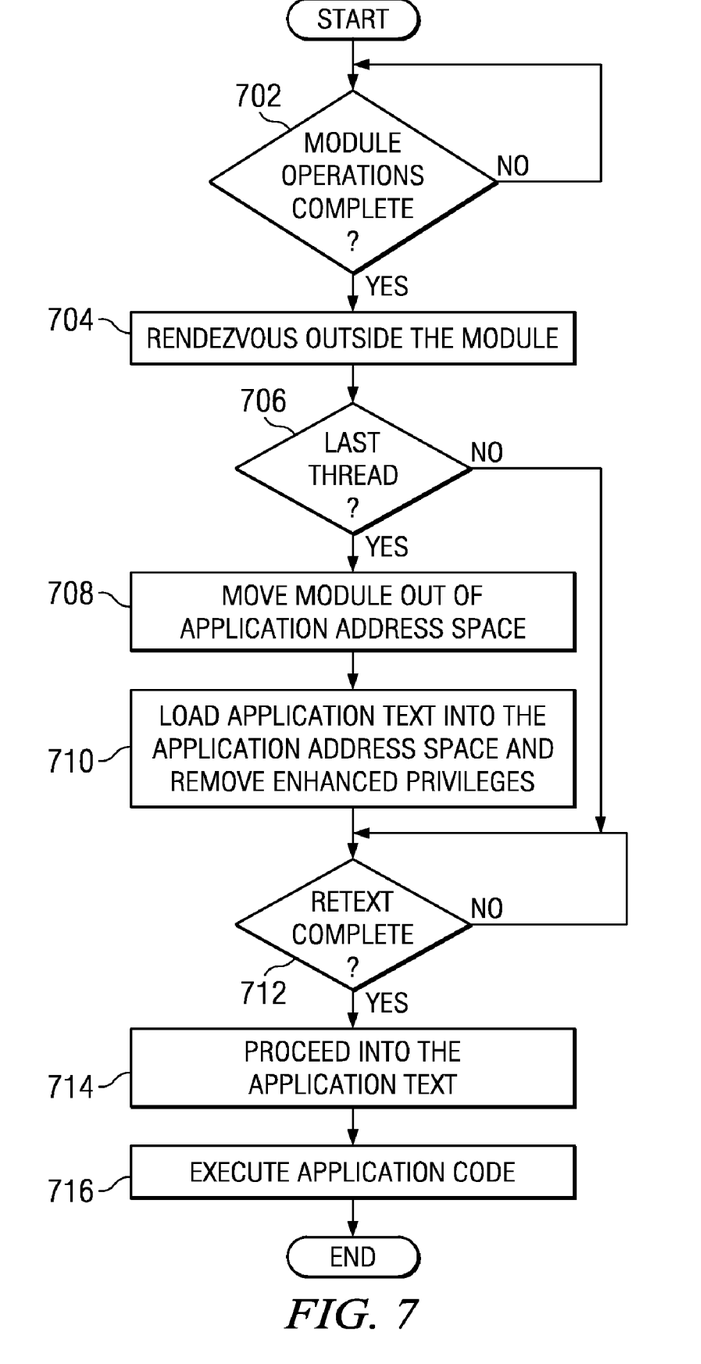
FIG. 7 is a flowchart illustrating a process for restoring application text to application address space after a process performed by a retext module is complete in accordance with an illustrative embodiment.

Referring now to FIG. 7, a flowchart illustrating a process for restoring application text to application address space after a process performed by a retext module is complete is depicted in accordance with an illustrative embodiment. The process in FIG. 7 is implemented by threads, such as threads 410 in FIG. 4.

The process begins by making a determination as to whether the operations performed by the retext module are complete (step 702). In this example, the retext module is a checkpoint module. The operations performed by the checkpoint module are complete when checkpoint data for a process running in a software partition that is being checkpointed has been generated and saved by the checkpoint module. If the retext module operations are not complete, the process returns to step 702 until the operations are complete.

When the retext module operations are complete, the threads rendezvous at a point outside the checkpoint module (step 704). A determination is made as to whether a thread is a last thread to enter the rendezvous (Step 706). The last thread to enter the rendezvous point is the primary thread. If a thread is not the last thread, the thread remains at the rendezvous until the retext is complete at step 712.

If a thread is the last thread at step 706, the thread is a primary thread and the thread uses operating system services to move the retext module out of the application address space (step 708). The application text is loaded back into the application address space and the enhanced privileges bequeathed to the application are removed (step 710). An enhanced privilege may also be referred to as a special privilege.

A determination is made as to whether the retext operation to restore the application text to the application address space is complete (step 712). If the retext is not complete, all the threads except the primary thread, continue to wait at the rendezvous point. When the retext is complete, all the threads, including the primary thread, proceed into the application text (step 714). The threads then execute the application code associated with the application text (step 716) with the process terminating thereafter.

Figure 8:
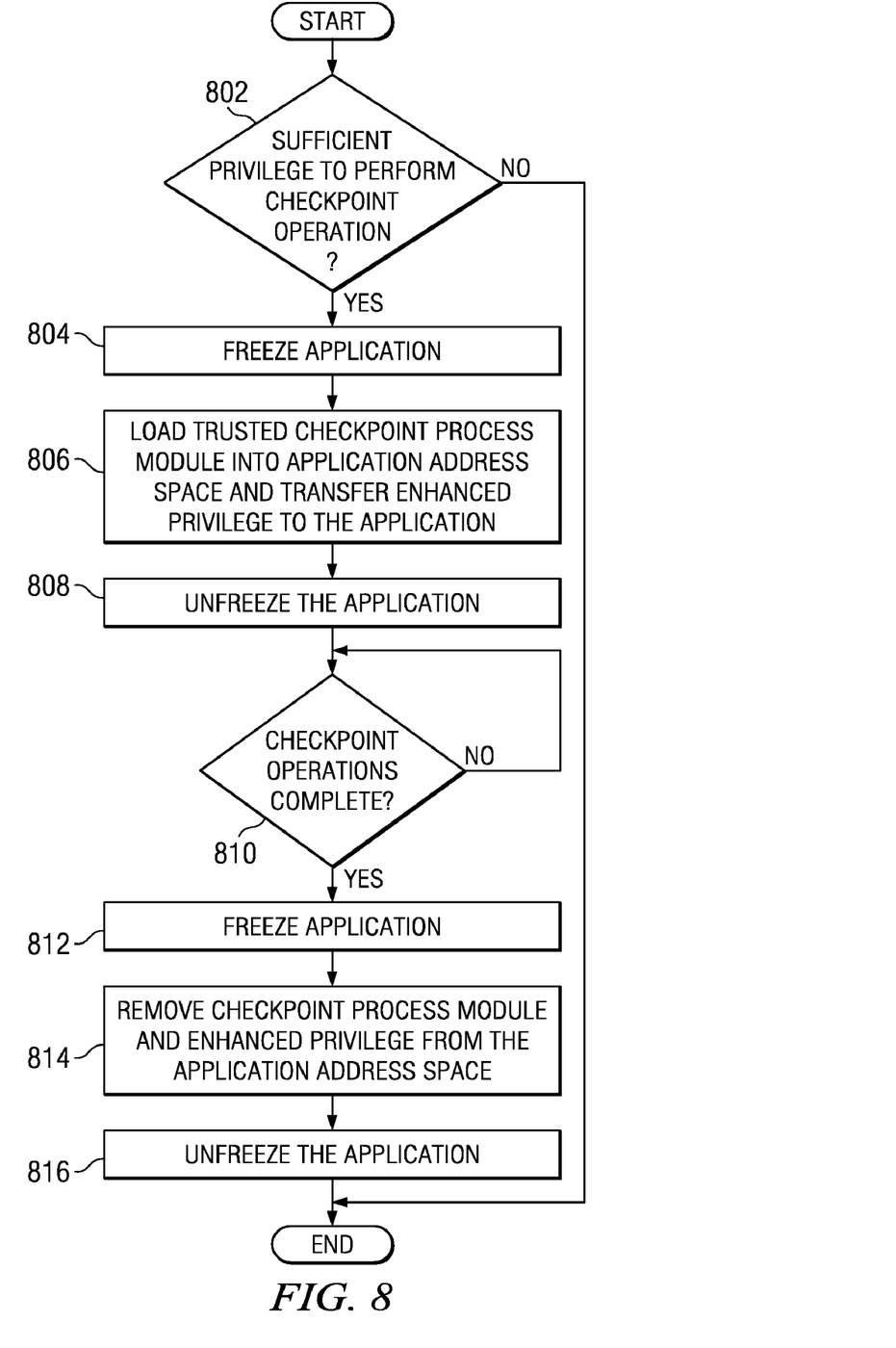
FIG. 8 is a flowchart illustrating a process for bequeathing a privilege to a checkpoint process in accordance with an illustrative embodiment.

FIG. 8 is a flowchart illustrating a process for bequeathing a privilege to a checkpoint process in accordance with an illustrative embodiment. The process in FIG. 8 is implemented by a process for initiating a retext operation and bequeathing special privileges to an application in an isolation environment, such as process initiator 402 in FIG. 4.

The process begins by making a determination as to whether the process initiator has sufficient privileges to perform a checkpoint operation (step 802). If the process initiator does not have sufficient privileges, the process terminates thereafter.

Returning to step 802, if the process initiator does have sufficient privileges, the process initiator freezes the application (step 804) to suspend execution of application text associated with the application. The process loads a trusted checkpoint process module into the address space of the application and transfers enhanced privileges to the application (step 806). The process then unfreezes the application (step 808) to allow the application to execute the trusted checkpoint process code.

The process makes a determination as to whether the checkpoint operations are complete (step 810). When the checkpoint operations are complete, the process initiator freezes the application (step 812). The process initiator removes the checkpoint process module and enhanced privileges from the application address space (step 814). The process initiator unfreezes the application so that the application can resume normal execution of application text (step 816) with the process terminating thereafter.

In the example in FIG. 8, the application text was not removed from the application address space. In this example, there was sufficient space in the application address space to permit the address space to accommodate both the application text and the trusted checkpoint process module. However, in another embodiment, if the address space is insufficient to hold both the application text and the trusted checkpoint module, the application text is removed prior to loading the trusted checkpoint process module. In this example, the application text is restored to the application address space when the trusted checkpoint code and enhanced privileges are removed from the application address space, as described in FIGS. 6 and 7 above.

In this manner, a checkpoint initiator which holds a special privilege may bequeath the special privilege to a trusted module running in a special context of another application. The applicability of the embodiments are not limited to checkpoint privileges, but can also include the ability to selectively bequeath an initiator's privilege into any trusted module supplied by the initiator and loaded into another application.

The illustrative embodiments provide a computer implemented method, apparatus, and computer program product for transferring a privilege to a module. In one embodiment, a set of privileges required to initiate execution of code associated with the software module is identified to form enhanced privileges. The application is frozen. The enhanced privileges are unassigned to the application and the application has insufficient privileges to initiate execution of code associated with the software module. The software module is loaded into available application address space associated with the application. The enhanced privileges are transferred to the application. Execution of the application is unsuspended and the code associated with the software module is executed within the application.

The process enables modules to be dynamically loaded with enhanced privileges even when an application address space is fully utilized by an application and data associated with the application. Moreover, a module may be dynamically loaded even if an application address space has some available space but the amount of available space is insufficient to accommodate a particular module that is to be dynamically loaded into the address space.

The retexting process of the illustrative embodiments permits the user to move the application text that is not needed during a checkpoint operation and replace the application text with the checkpoint module. The retexting process then bequeaths a special privilege to the checkpoint module. After the checkpoint procedure performed by the checkpoint module is complete, the retexting operation automatically and dynamically removes the checkpoint module and special privilege. This increases the efficiency of the checkpoint process and decreases the need for expensive memory.

In addition, this process permits the dynamically loaded module to perform operations that would normally be restricted by the applications normal privileges. However, because special privileges are bequeathed to the application by the process of the illustrative embodiments, the retext module is able to perform privileged operations using the special privileges that are temporarily bequeathed to the application.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved. In addition, the invention may be implemented with fewer steps than shown in the figures and/or with additional steps not shown in the figures.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk, millipede storage technology, Magneto-resistive random access memory (MRAM), or phase-change memory, also known as PCM, PRAM, Ovonic Unified Memory, and Chalcogenide RAM (C-RAM). Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for transferring a privilege to a software module, the computer implemented method comprising:
    identifying a set of privileges required to initiate execution of program code associated with the software module to form enhanced privileges;
    freezing execution of an application running in a software partition, wherein the enhanced privileges are unassigned to the application, and wherein the application has insufficient privileges to initiate execution of the program code associated with the software module;
    loading the software module into available application address space associated with the application; and
    transferring the enhanced privileges to the application, wherein the application is unfrozen and the code associated with the software module is executed within the application.

2. The computer implemented method of claim 1 further comprising:
    determining whether the enhanced privileges are assigned to a process initiator, wherein the process initiator transfers the enhanced privileges to the application.

3. The computer implemented method of claim 1 further comprising:
    rendezvousing a plurality of threads associated with the application to a point outside an application text associated with the application, wherein execution of the plurality of threads is suspended;
    moving the application text out of an application address space for the application to form the available application address space, wherein the available application address space is an address space previously occupied by the application text; and
    loading the software module into the available application address space, wherein the software module comprises trusted code.

4. The computer implemented method of claim 3 further comprising:
    responsive to loading the software module into the available application address space, allowing the plurality of threads to proceed out of a rendezvous point and into the software module; and
    executing, by the plurality of threads, program code associated with the software module.

5. The computer implemented method of claim 1 wherein the software module is a checkpoint module for performing checkpoint operations to generate and save state data associated with the application.

6. The computer implemented method of claim 1 further comprising:
    responsive to a determination that checkpoint operations are complete, rendezvousing a plurality of checkpoints to a point outside a checkpoint module;
    moving the checkpoint module out of the application address space associated with the application to form the available application address space;
    removing the enhanced privileges from a plurality of privileges assigned to the application; and
    loading the application text into the available application address space.

7. The computer implemented method of claim 1 further comprising:
    responsive to receiving a request to checkpoint a software partition, sending a checkpoint signal to a plurality of threads by a process initiator.

8. The computer implemented method of claim 1 further comprising:
    identifying a load checkpoint module function in a library of functions, wherein the load checkpoint function loads the software module into the available application address space.

9. The computer implemented method of claim 1 further comprising:
    performing, by a primary thread, an untext operation, wherein the untext operation moves an application text out of a current executable text area and sets up the available application address space.

10. A computer program product comprising:
one or more computer-readable, tangible storage devices having computer usable program code for transferring privileges to a module stored in at least one of the one or more computer-readable, tangible storage devices, said computer program product comprising:
computer usable program code for identifying a set of privileges required to initiate execution of program code associated with a software module to form enhanced privileges;
computer usable program code for freezing execution of an application running in a software partition, wherein the enhanced privileges are unassigned to the application, and wherein the application has insufficient privileges to initiate execution of the program code associated with the software module;
computer usable program code for loading the software module into available application address space associated with the application; and
computer usable program code for transferring the enhanced privileges to the application, wherein the application is unfrozen and the code associated with the software module is executed within the application.

11. The computer program product of claim 10 further comprising:
computer usable program code for determining whether the enhanced privileges are assigned to a process initiator, wherein the process initiator transfers the enhanced privileges to the application.

12. The computer program product of claim 10 further comprising:
computer usable program code for rendezvousing a plurality of threads associated with the application to a point outside an application text associated with the application, wherein execution of the plurality of threads is suspended;
computer usable program code for moving the application text out of an application address space for the application to form the available application address space, wherein the available application address space is an address space previously occupied by the application text; and
computer usable program code for loading the software module into the available application address space, wherein the software module comprises trusted code.

13. The computer program product of claim 11 further comprising:
computer usable program code for responsive to loading the software module into the available application address space, allowing a plurality of threads to proceed out of a rendezvous point and into the software module; and
computer usable program code for executing, by the plurality of threads, program code associated with the software module.

14. The computer program product of claim 10 wherein the software module is a checkpoint module for performing checkpoint operations to generate and save state data associated with the application.

15. The computer program product of claim 10 further comprising:
computer usable program code for rendezvousing a plurality of threads to a point outside the process module in response to a determination that operations performed by a process module are complete;
computer usable program code for moving the process module out of the application address space associated with the application to form the available application address space;
computer usable program code for removing the enhanced privileges from a plurality of privileges assigned to the application; and
computer usable program code for loading the application text into the available application address space.

16. The computer program product of claim 13 further comprising:
computer usable program code for sending a checkpoint signal to the plurality of threads by a process initiator in response to receiving a request to checkpoint a software partition.

17. The computer program product of claim 10 further comprising:
computer usable program code for identifying a load checkpoint module function in a library of functions, wherein the load checkpoint function loads the software module into the available application address space.

18. The computer program product of claim 10 further comprising:
computer usable program code for performing, by a primary thread, an untext operation, wherein the untext operation moves an application text out of a current executable text area and sets up the available application address space.

19. An apparatus comprising:
a bus system;
a communications system coupled to the bus system;
a memory connected to the bus system, wherein the memory includes computer usable program code; and
a processing unit coupled to the bus system, wherein the processing unit executes the computer usable program code to identify a set of privileges required to initiate execution of program code associated with a software module to form enhanced privileges; freeze execution of an application running in a software partition, wherein the enhanced privileges are unassigned to the application, and wherein the application has insufficient privileges to initiate execution of the program code associated with the software module; load the software module into available application address space associated with the application; and transfer the enhanced privileges to the application, wherein the application is unfrozen and the code associated with the software module is executed within the application.

20. The apparatus of claim 19 wherein the processing unit further executes the computer usable program code to rendezvous a plurality of threads to a point outside a process module in response to a determination that operations performed by the process module are complete; move the process module out of the application address space associated with the application to form the available application address space; remove the enhanced privileges from a plurality of privileges assigned to an application; and load the application text into the available application address space.

* * * * *